US012719719B2

(12) United States Patent
Hua

(10) Patent No.: US 12,719,719 B2
(45) Date of Patent: Aug. 25, 2026

(54) ULTRA-WIDE BAND SIGNAL RECEIVER

(71) Applicant: Osemitech Co., Ltd., Hefei City (CN)

(72) Inventor: Jie Hua, Hefei (CN)

(73) Assignee: Osemitech Co., Ltd., Hefei (CN)

(*) Notice: Subject to any disclaimer, the term of this patent is extended or adjusted under 35 U.S.C. 154(b) by 46 days.

(21) Appl. No.: 19/004,179

(22) Filed: Dec. 27, 2024

(65) Prior Publication Data

US 2025/0219872 A1 Jul. 3, 2025

(30) Foreign Application Priority Data

Dec. 28, 2023 (CN) ......................... 202311871736.1

(51) Int. Cl.
*H04L 25/02* (2006.01)
*H04B 1/16* (2006.01)
*H04L 25/40* (2006.01)

(52) U.S. Cl.
CPC ....... *H04L 25/0204* (2013.01); *H04B 1/1638* (2013.01); *H04L 25/40* (2013.01)

(58) Field of Classification Search
CPC ... H04L 25/0204; H04L 25/40; H04B 1/1638; H04B 1/16
See application file for complete search history.

(56) References Cited

U.S. PATENT DOCUMENTS

| | | | | |
|---|---|---|---|---|
| 8,879,678 | B1 * | 11/2014 | Rajurkar | H04B 1/7117 375/347 |
| 2009/0124204 | A1 * | 5/2009 | Howard | H04B 1/7117 455/59 |
| 2022/0407765 | A1 * | 12/2022 | Dehmas | H04L 27/2646 |

* cited by examiner

*Primary Examiner* — David S Huang

(57) ABSTRACT

An embodiment of the present application provides an ultra-wide band (UWB) signal receiver, including: a signal processing unit, configured to perform correlation processing on sampled discrete received signals to obtain a first processing result; a determination unit, configured to capture the first processing result and determine an index value corresponding to the strongest path of the received signal; and a channel estimation unit, configured to generate a control signal according to the index value. In this way, part of processing modules in the signal processing unit can be turned off during channel estimation to reduce the power consumption of the channel estimation.

10 Claims, 6 Drawing Sheets

Clock generation module

Clock control module

Signal processing unit

ULTRA-WIDE BAND SIGNAL RECEIVER

CROSS-REFERENCE TO RELATED APPLICATION

This application claims priority of Chinese Patent Application No. 202311871736.1, filed on Dec. 28, 2023, the entire contents of which are incorporated herein by reference.

TECHNICAL FIELD

Embodiments of the present application relate to the technical field of channel estimation, and relate, but are not limited to, an ultra-wide band (UWB) signal receiver.

BACKGROUND

Channel estimation in a wireless communication system is an important technical means to improve system performance and signal quality, to satisfy the user's demand for communication with high speed rate, high reliability and low latency. Therefore, the channel estimation of the wireless communication system can improve the signal quality and the system performance.

In the prior art, the channel estimation is realized by means of a pilot frequency reference signal, and the implementation of the pilot frequency reference signal is relatively simple. A transmitting end only needs to insert an additional pilot frequency sequence in the transmission, and a receiving end performs the channel estimation by sampling and comparing a pilot frequency signal with a received signal. However, the time delay extension of different channels is far less than a period of a preamble symbol sequence, so there are more useless data in a time domain channel impulse response calculated by a signal processing unit.

Therefore, how to turn off part of processing modules in the signal processing unit during the channel estimation and reduce the power consumption of the channel estimation is an urgent problem to be solved.

SUMMARY

In view of this, an embodiment of the present application provides a UWB signal receiver, including a signal processing unit, a determination unit and a channel estimation unit, by which the power consumption of the channel estimation is reduced. A UWB signal receiver provided by an embodiment of the present application is realized in the following way:

A UWB signal receiver provided by an embodiment of the present application includes a signal processing unit, a determination unit and a channel estimation unit, the signal processing unit being connected to the determination unit and the channel estimation unit, and the determination unit being also connected to the channel estimation unit.

The signal processing unit includes a plurality of processing modules, and the signal processing unit is configured to perform correlation processing on a plurality of sampled discrete received signals through a preamble symbol sequence and the plurality of processing modules to obtain a first processing result, the plurality of sampled discrete received signals being a plurality of signals after sampling the received signals;

the determination unit is configured to capture the first processing result and determine an index value corresponding to the strongest path of the received signal;

the channel estimation unit is configured to generate a control signal according to the index value, and the control signal is configured to control part of the processing modules in the signal processing unit to be in a closed state;

the signal processing unit is further configured to control the part of the processing modules to be in the closed state according to the control signal, and perform correlation processing on the plurality of sampled discrete received signals by using remaining processing modules in an open state and the preamble symbol sequence to obtain a second processing result; and the channel estimation unit is further configured to perform channel estimation according to the second processing result to obtain a channel estimation result.

In some embodiments, the signal processing unit further includes a clock generation module and a clock control module, the clock generation module being configured to generate a preset clock signal;

the clock control module being configured to receive the control signal; and each of the processing modules being configured to be in a target working state under the action of the preset clock signal and the control signal, the target working state including the open state or the closed state, in which, when a clock control signal is in a high level state, the target working state is in the open state; and when a clock control signal is in a low level state, the target working state is in the closed state.

In some embodiments, the plurality of sampled discrete received signals include N discrete received signals, and the plurality of processing modules include K processing module groups, each of the processing module groups being configured to perform correlation processing on the L sampled discrete received signals, N being a product of K and L, K being a length of the preamble symbol sequence, L being a spreading factor, and N, K and L being positive integers.

In some embodiments, the signal processing unit further includes a cyclic shift register, the cyclic shift register including K flip-flops, and an output of each flip-flop, connected to one corresponding processing module group, being configured to output a shifted preamble symbol sequence to the corresponding processing module group; and each of the processing module groups is configured to perform correlation processing on the L discrete received signals according to the shifted preamble symbol sequence outputted by a corresponding flip-flop.

In some embodiments, the clock control module includes K output ends; and each of the output ends is connected to one of the plurality of processing module groups, and each of the output ends is configured to output data of one of K bits of the control signal, the clock control module being configured to respectively act each of the K bits of the control signal on one of the processing module groups, allowing each processing module in the corresponding processing module group to be in the target working state.

In some embodiments, the control signal includes K bits, and generating, by the channel estimation unit, a control signal according to the index value includes:

determining an index number of a target processing module group corresponding to the strongest path according to the index value and the number of processing modules included in each processing module group; and generating the control signal according to the index number of the target processing module group, with the bits in the control signal within a first preset distance range of the index number set to a high level and remaining bits set to a low level.

In some embodiments, the first preset distance range includes S bits before the bit corresponding to the index number, and Q bits after the bit corresponding to the index number, S and Q being preset parameters and being positive integers.

In some embodiments, the clock control module includes W output ends, each of the output ends being connected to R processing module groups in the plurality of processing module groups, and each of the output ends being configured to output data of one of W bits of the control signal, the clock control module being configured to respectively act each of the W bits of the control signal on R corresponding processing module groups, allowing each processing module in the R corresponding processing module groups to be in the target working state, $R=\lceil K/W \rceil$, $\lceil K/W \rceil$ indicating that a result of K/W is rounded up.

In some embodiments, the control signal includes W bits, and generating, by the channel estimation unit, a control signal according to the index value includes:

determining an index number of a target processing module group corresponding to the strongest path according to the index value and the number of processing modules included in each processing module group; and generating the control signal according to the index number of the target processing module group, with the bits in the control signal within a second preset distance range of the index number set to a high level and remaining bits set to a low level.

In some embodiments, the second preset distance range includes $\lceil S/R \rceil$ bits before the bit corresponding to the index number, and $\lceil Q/R \rceil$ bits after the bit corresponding to the index number, S and Q being preset parameters and being positive integers, $\lceil S/R \rceil$ indicating that a result of S/R is rounded up, and $\lceil Q/R \rceil$ indicating that a result of Q/R is rounded up.

The UWB signal receiver provided by the embodiment of the present application includes a signal processing unit, a determination unit, and a channel estimation unit. The signal processing unit includes a plurality of processing modules for performing correlation processing on sampled discrete received signals to obtain a first processing result. The determination unit is configured to capture the first processing result to determine an index value corresponding to the strongest path of the received signal. The channel estimation unit is configured to generate a control signal according to the index value, part of the processing modules in the signal processing unit being in a closed state. The signal processing unit controls part of the processing modules to be in a closed state and performs correlation processing on the sampled discrete received signals by using remaining processing modules in an open state and the preamble symbol sequence, to obtain a second processing result. The channel estimation unit is configured to perform channel estimation according to the second processing result, to obtain a channel estimation result. In this way, the receiver can dynamically turn off part of the processing modules according to actual demands, thereby reducing the power consumption. By dynamically controlling the turning on and turning off of the processing modules according to the channel condition, it is possible to realize the fine control of power consumption to solve the technical problems raised in the background.

BRIEF DESCRIPTION OF THE DRAWINGS

The accompanying drawings herein are incorporated into and form a part of the specification, and these accompanying drawings illustrate embodiments in accordance with the present application and are used in conjunction with the specification to illustrate the technical solutions of the present application.

DETAILED DESCRIPTION

To make objects, technical solutions and advantages of embodiments of the present application clearer, the specific technical solutions of the present application will be described in further detail below in conjunction with the accompanying drawings in the embodiments of the present application. The following embodiments are used for illustrating the present application, rather than limiting the scope of the present application.

Unless otherwise defined, all technical and scientific terms used herein have the same meaning as commonly understood by those skilled in the technical field of the present application. The terms used herein are for the purpose of describing the embodiments of the present application only, rather than limiting the present application.

In the following description, reference is made to "some embodiments", which describe a subset of all possible embodiments. However, it is understood that "some embodiments" may be the same subset or a different subset of all possible embodiments and may be combined with each other without conflict.

It is to be noted that the term "first/second/third" referred to in the embodiments of the present application is used for distinguishing between similar or different objects and does not represent a particular ordering of the objects. It is understood that "first\second\third" can be interchanged in a specific order or sequence if permitted, so that the embodiments of the present application described herein can be implemented in other orders than those illustrated or described herein.

Figure 1:
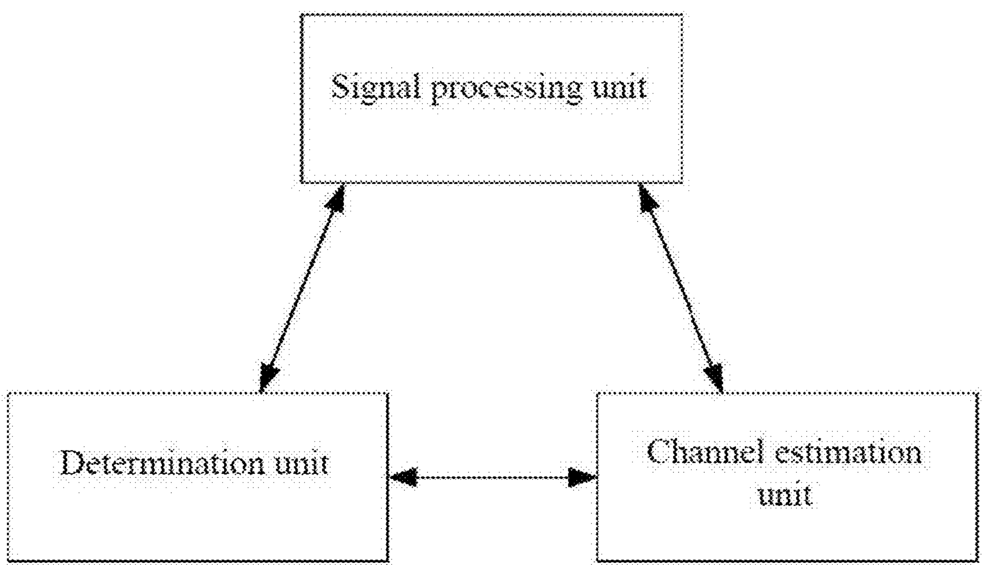
FIG. 1 is a schematic diagram of a structure of a UWB signal receiver disclosed by an embodiment of the present application.

In view of the foregoing, an embodiment of the present application provides a schematic diagram of a structure of a UWB signal receiver. FIG. 1 is a schematic diagram of a structure of a UWB signal receiver provided by an embodiment of the present application. As shown in FIG. 1, the structure of the UWB signal receiver may include the following: a signal processing unit, a determination unit, and a channel estimation unit.

The signal processing unit is connected to the determination unit and the channel estimation unit, and the determination unit is also connected to the channel estimation unit. The signal processing unit includes a plurality of processing modules, and the signal processing unit is configured to perform correlation processing on a plurality of sampled discrete received signals through a preamble symbol sequence and the plurality of processing modules to obtain a first processing result, the plurality of sampled discrete received signals being a plurality of signals after sampling the received signals.

In an embodiment of the present application, it is first necessary to sample signals through a receiving antenna to obtain a plurality of discrete received signals. Herein, a sampling frequency is usually many times higher than a bandwidth of UWB signals, and to avoid aliasing, suitable sampling rate selection and filtering processing are required.

The plurality of sampled discrete received signals are input to a signal processing unit for correlation processing by means of a preamble symbol sequence and a plurality of processing modules. Each processing module in the signal processing unit performs correlation operations on the received signals to obtain processing results. These processing results may be combined to obtain a first processing result.

The determination unit is configured to capture the first processing result to determine an index value corresponding to the strongest path of the received signal.

In an embodiment of the present application, the first processing result is input to the determination unit. The determination unit searches for a desired signal in the received signal that satisfies a preset condition by searching for a maximum magnitude value, and determines the index value corresponding to the strongest path of the received signal in the presence of the desired signal. This index value is a time delay value.

The channel estimation unit is configured to generate a control signal according to the index value, and the control signal is configured to control part of the processing modules in the signal processing unit to be in a closed state.

In an embodiment of the present application, the channel estimation unit generates, according to the index value, a control signal for controlling part of the processing modules in the signal processing unit to be in a closed state. This control signal is a closing index for dynamically closing some processing modules in the signal processing unit for subsequent channel estimation.

The signal processing unit is further configured to control the part of the processing modules to be in the closed state according to the control signal, and perform correlation processing on the plurality of sampled discrete received signals by using remaining processing modules in an open state and the preamble symbol sequence to obtain a second processing result.

In an embodiment of the present application, the signal processing unit controls the part of the processing modules to be in the closed state according to the control signal, and perform correlation processing on the plurality of sampled discrete received signals by using remaining processing modules in an open state and the preamble symbol sequence to obtain a second processing result.

The channel estimation unit is further configured to perform channel estimation according to the second processing result to obtain a channel estimation result.

In an embodiment of the present application, the channel estimation unit performs channel estimation according to the second processing result, in a specific manner including estimating a channel impulse response, extracting multipath information, calculating a multipath arrival time, updating a path fading coefficient, and the like.

By controlling the closed state of part of the processing modules, the embodiment of the present application can realize saving of resources and energy consumption, and compared with the traditional method of keeping all processing modules open all the time, the embodiment of the present application can flexibly adjust the number of processing modules according to the actual demands to avoid waste of resources.

The technical principles of the technical solution to obtain the embodiments of the present application will be described below.

Figure 2:
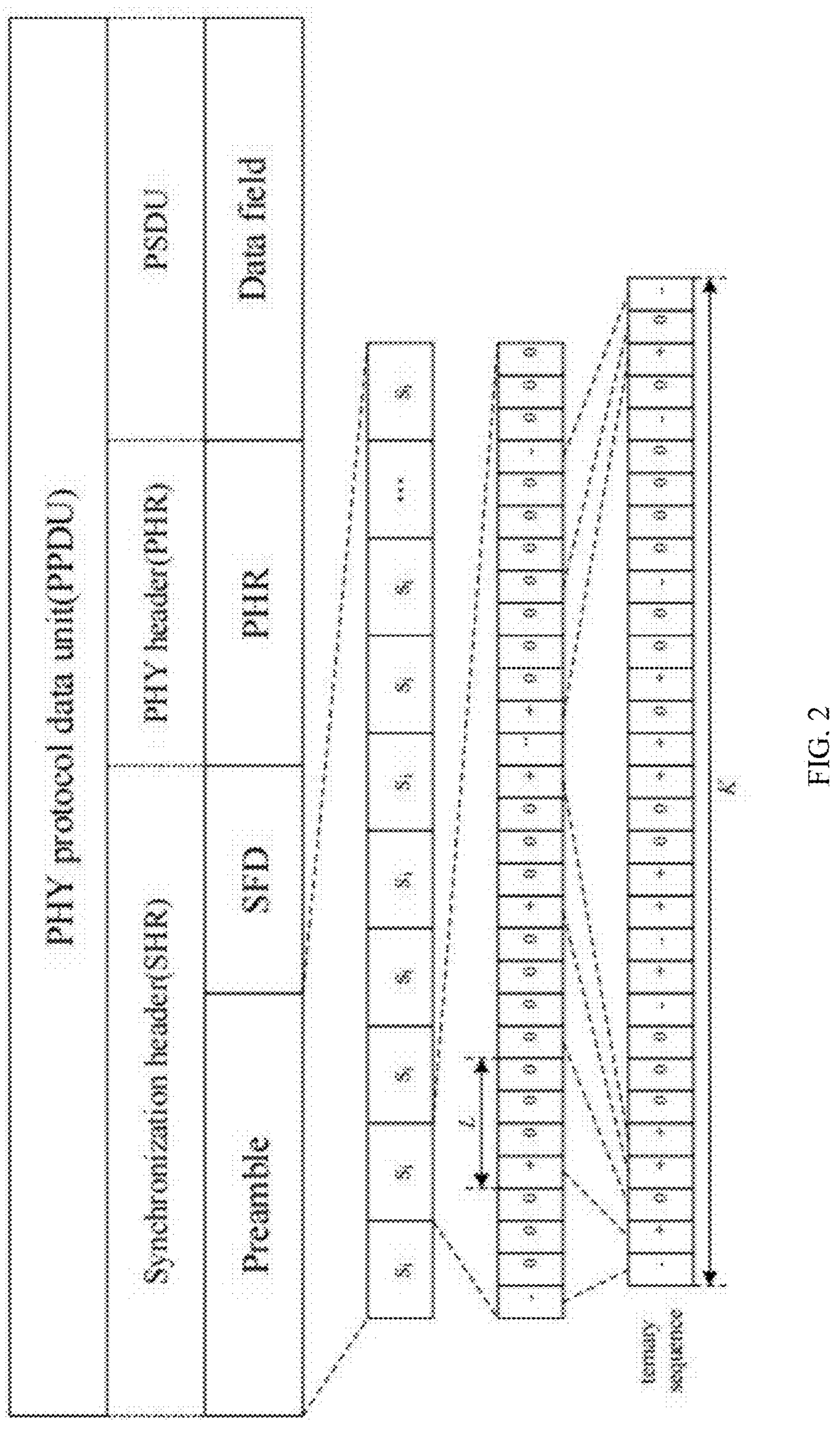
FIG. 2 is a structural diagram of a UWB physical layer (PHY) frame disclosed by an embodiment of the present application.

FIG. 2 is a structure diagram of a standard UWB PHY frame provided by an embodiment of the present application. As shown in FIG. 2, the structure diagram of the UWB PHY frame includes three parts: a synchronization header (SHR), a physical layer header (PHR) and a physical layer service data unit (PSDU). SHR is divided into two subparts: synchronization (SYNC) and start of frame delimiter (SFD). The SYNC segment contains a series of preamble symbols consisting of K consecutive ternary symbols {−1,0,1}. A baseband waveform of the preamble symbol sequence can be expressed in a time domain as follows:

$$b(t)=\sum_{m=-\infty}^{+\infty}\sum_{i=0}^{KL-1}(c[i]\cdot p(t-mKLT_c-iT_c))$$

where $T_c$ represents a chip period, c[i] is an $i^{th}$ ternary code symbol, L is a spreading factor, and p(t) corresponds to a baseband impulse response.

A baseband signal b(t) is up-converted, and a final transmitted waveform can be obtained:

$$s(t)=\left(\sum_{m=-\infty}^{+\infty}\sum_{i=0}^{KL-1}(c[i]\cdot p(t-mKLT_c-iT_c))\right)\cdot e^{j2\pi Mt/T_c}$$

where M is equal to a ratio of a carrier frequency to a chip frequency.

It is assumed that a channel impulse response of a multipath fading channel can be expressed as $$h(t)=\sum_{r=0}^{l-1}h_r\cdot\delta(t-\tau_r)$$

where the gain of an $r^{th}$ path and the path delay are represented as $h_r$ and $t_r$, respectively, and I is the number of multipath paths.

After the transmitted signal s(t) passes through a channel, additive Gaussian white noise η(t) is also introduced, and then the signal after passing through the channel can be expressed as $$y(t) = s(t) * h(t) + \eta(t) = \sum_{r=0}^{l-1} \left( \sum_{m=-\infty}^{+\infty} \sum_{i=0}^{KL-1} (h_r \cdot c[i] \cdot p(t - mKLT_c - iT_c - \tau_r)) \right) \cdot e^{-j2\pi M(t-\tau_r)/T_c} + \eta(t).$$

Figure 3:
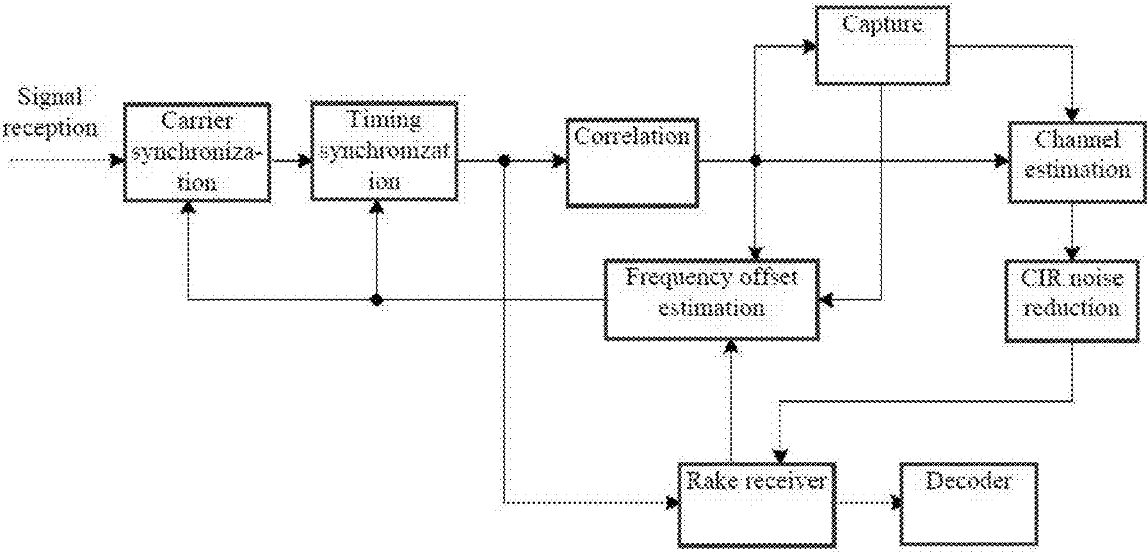
FIG. 3 is an architectural diagram of the UWB signal receiver disclosed by an embodiment of the present application.

FIG. 3 is an architectural diagram of a UWB signal receiver provided by an embodiment of the present application. As shown in FIG. 3, based on the good autocorrelation and cross-correlation properties of the preamble symbol sequence, the signal processing unit performs correlation processing on the received signal using a local ternary code. An output signal of the signal processing unit is fed to a determination unit on the one hand for determining the existence of the desired data frame, and on the other hand, the output signal is given to a channel estimation unit, to generate a time domain channel impulse response.

The receiving end can obtain the baseband signal z(t) after down-converting the signal y(t), and a time domain form can be expressed as $$z(t) = y(t) \cdot e^{-j2\pi Mt/T_c} = \sum_{r=0}^{l-1} \left( \sum_{m=-\infty}^{+\infty} \sum_{i=0}^{KL-1} (h_r \cdot c[i] \cdot p(t - mKLT_c - iT_c - \tau_r)) \right) \cdot e^{-j2\pi M\tau_r/T_c} + \eta'(t).$$

Baseband signals need to be sampled with a sampling clock with a frequency of $1/T_c$ before digital processing. It is assumed that all path delays $\tau_r$ can be divisible by $T_c$, a sampled discrete signal z[n] can be obtained, satisfying $$z[n] = \sum_{r=0}^{l-1} \left( \sum_{m=-\infty}^{+\infty} \sum_{i=0}^{KL-1} (h_r \cdot c[i] \cdot p[n - mKL - i - \tau_r / T_c]) \right) + \hat{\eta}(n).$$

Since the UWB transceiver and receiver are not synchronized in timing, there is an unknown phase difference in N sampling periods between the local preamble symbols $c_r[i]$ and the preamble symbols of the first multipath component in the received signal, which satisfies $$c_r[i] = c[\mathrm{mod}(i + N, KL)],\ i \in [0, KL)$$

In the signal processing unit, the local preamble symbols $c_r[i]$ are cyclically correlated with the discrete signal z[n], and KL discrete correlation outputs in one preamble symbol sequence cycle can be obtained, and a $k^{th}$ correlation output can be expressed as $$r[k] = \sum_{n=0}^{KL-1} c_r[n-k] \cdot z[n] = \sum_{r=0}^{l-1} (h_r \cdot R(\mathrm{mod}(k - N - \tau_r / T_c, KL))) + \hat{\eta}[k]$$

where R(k) represents the amount of inter-correlation between a transmitted baseband signal and a local ternary code under ideal conditions, and R(k) has a peak value $R_{con}$ when k=0, and rest positions are almost 0.

Figure 4:
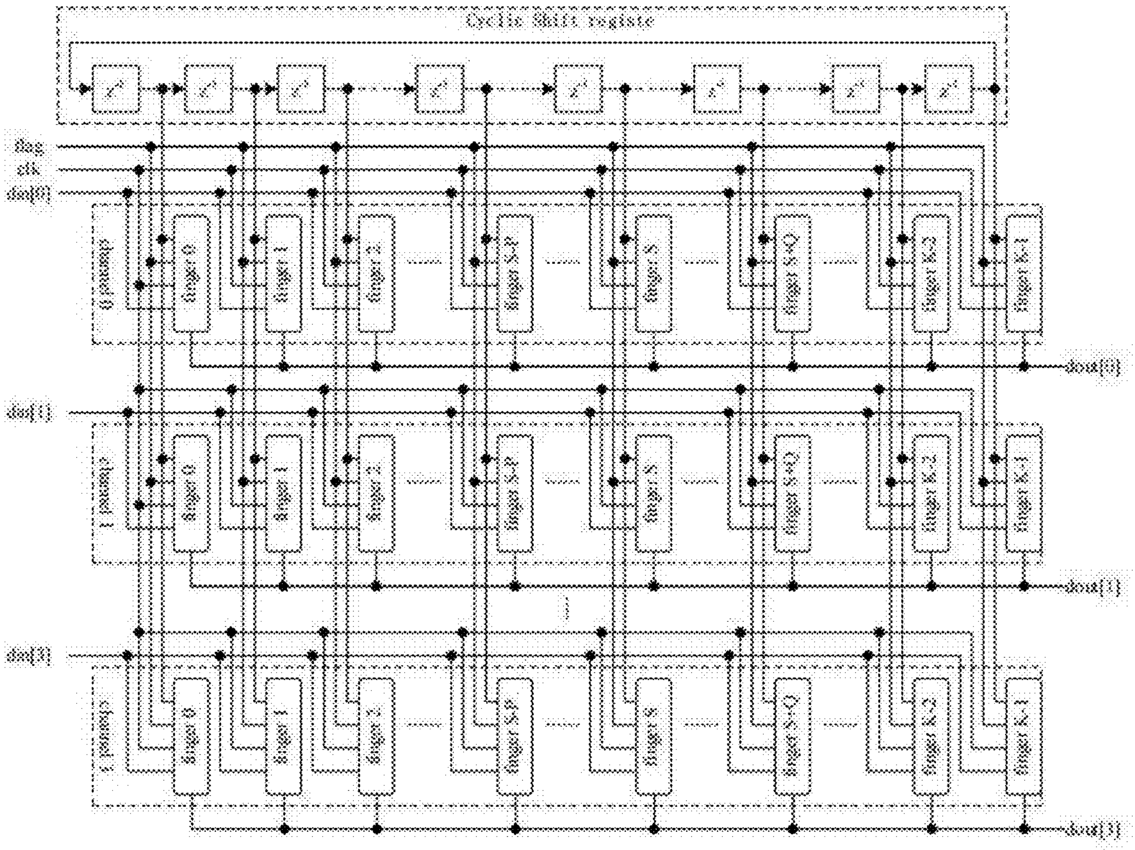
FIG. 4 is an architectural diagram of the UWB signal receiver disclosed by an embodiment of the present application.

FIG. 4 is an architectural diagram of a UWB signal receiver provided by an embodiment of the present application. As can be seen from FIG. 4, since the preamble training sequence information in the transmitted baseband waveform is known to the receiving end, the signal processing unit uses the known information to calculate the correlation result and estimate the channel impulse response. The signal processing unit includes a cyclic shift register, a channel module and a control module, and the channel module includes K finger units and a signal processing logic. A flag signal contains K control signals to initialize an accumulator of each finger unit, start the accumulation task for a new preamble symbol sequence cycle, and output an accumulation result of a previous cycle. Since the accumulation outputs of the different finger units are time-shared valid in a time domain, the parallel-serial conversion can be realized by using a multiple-choice-one logic.

Figures 5, 6:
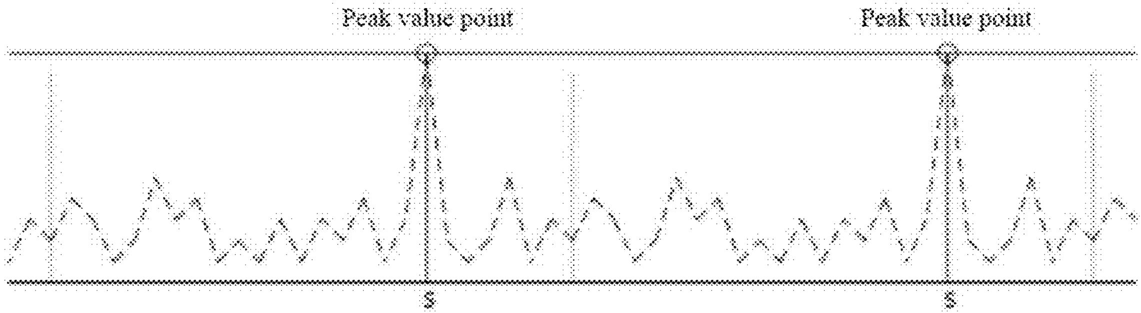
FIG. 5 is a schematic diagram of capturing a received signal in the UWB signal receiver disclosed by an embodiment of the present application.
FIG. 6 is a schematic diagram of a structure of a UWB signal receiver disclosed by an embodiment of the present application.

FIG. 5 is a schematic diagram of capturing a received signal in a UWB signal receiver provided by an embodiment of the present application. As can be seen from FIG. 5, the determination unit calculates amplitude values |r[k]| of KL discrete correlation outputs in each preamble symbol sequence cycle and counts the maximum, minimum and average values in the amplitude values, and finally determines whether each parameter satisfies the set conditions, and when the conditions are satisfied, the capturing of the desired signal is completed.

It is assumed that an index value of a peak point acquired at the time of capture is S, and a path delay of the strongest path in the received signal is $\tau_{max}$, then the relationship between the two satisfies:

$$S = N + \tau_{max} / T_c$$

After the capture is completed, the receiver needs to perform frequency offset estimation, loop locking and other operations to eliminate the frequency deviation and timing deviation in the received signal. In the channel estimation stage, the discrete correlation outputs corresponding to the same index values in a plurality of consecutive preamble symbol sequence periods can be summed up to reduce the interference of non-ideal factors such as noise.

The channel estimation means acquiring all path gains $h_r$ and path delay $\tau_r$ from statistical average $\hat{r}[k]$ of correlation outputs r[k] with the following corresponding relation $$\begin{cases} h_r = \hat{r}\left[S - \frac{\tau_{max}}{T_c} + \frac{\tau_r}{T_c}\right] \Big/ R_{con} \\ l_r = S - \frac{\tau_{max}}{T_c} + \frac{\tau_r}{T_c} \end{cases}$$

A time interval $\Delta\tau$ between a first multipath component and a last multipath component of the channel is called time delay extension, which satisfies $\Delta\tau=\tau_{l-1}-\tau_0$. Taking IEEE UWB channels CM1, CM2, CM3 and CM4 as an example, the time delay extension of different channels is much less than one preamble symbol sequence period $KLT_c$, i.e., it implies that there is more useless data in a time-domain channel impulse response computed by a coherence unit.

Before the channel estimation is completed, the specific information of each multipath component in the channel is unknown, and an index value S of a peak point obtained in a capture phase can be utilized. The index value S corresponds to the strongest path of the received signal, and an index value $l_r$ corresponding to the rest of the multipath components is located around the index value S, with an index value S as the center, and enough area is reserved in the front and rear, which means that all the multipath components can be included.

Based on the above technical principle, a control signal finger_en of length K-bits is defined, each bit corresponds to a finger unit with the same index value (e.g., bit 0 corresponds to finger 0).

During the channel estimation phase, bits (S'−P) to bits (S'+Q) of finger_en are set to 1, so that specific finger units can be selectively enabled for channel estimation. With the flexible setting of finger_en, finger units used for channel estimation can be selected according to specific requirements, to further optimize the system performance.

The newly added clock control module uses the control signal finger_en to generate a clock signal for controlling the working clocks of the same numbered finger units in the channel. In this way, fine gating clock management can be realized for each finger unit, and specific finger units can be selectively turned on or off as needed to reduce power consumption and improve the energy efficiency ratio.

To reduce the size of the clock control module, finger units in each channel module can be processed in chunks, with the units in the same chunk having the same gated clock, and a bit width of the control signal finger_en is reduced from K to $\lceil K/W \rceil$, and the number of clock gating units required is also reduced. A value of W needs to be selected and configured based on the actual situation, and will not be discussed herein.

In an embodiment of the present application, the chip power consumption consists of static power consumption and dynamic power consumption. The dynamic power consumption is derived from two sources: one is the switching power consumption of a load capacitor when the gate is switched; and the other is the short-circuit power consumption of short-circuit current when series-parallel structures of PMOS and NMOS transistors are both conductive.

In the channel estimation stage, through a more fine gating clock management for each finger unit, turning on only the clock of the selected finger unit and turning off the clock of the unselected finger unit, the logic in the unselected finger unit will no longer flip, and the corresponding dynamic power consumption will be effectively reduced, thereby reducing the power consumption of the entire computing process. A ratio of the dynamic power consumption of the solution provided by the embodiment of the present application to an original solution is approximately equal to ratio=(P+Q+1)/K.

Based on the above technical principles, the present application also provides several other specific implementations as follows:

FIG. 6 is a schematic diagram of a structure of another UWB signal receiver provided by an embodiment of the present application. As shown in FIG. 6, the signal processing unit further includes a clock generation module and a clock control module. The clock generation module is configured to generate a preset clock signal. Alternatively, the clock generation module is configured to generate a preset clock signal, and the preset clock signal is configured to synchronize a working rhythm of the processing module. The clock generation module may use a crystal oscillation or other suitable method to generate a stable clock signal.

Further, the clock control module is configured to receive the control signal. Alternatively, the clock control module receives a control signal which is configured to control a working state of the processing module. The clock control module may be a logic circuit or a component such as a microcontroller. It is responsible for monitoring the level state of the control signal and controlling the working state of the processing module according to the level state.

Further, each of the processing modules is configured to be in a target working state under the action of the preset clock signal and the control signal, the target working state including the open state or the closed state. When a clock control signal is in a high level state, the target working state is in the open state; and when a clock control signal is in a low level state, the target working state is in the closed state. Alternatively, each processing module is in a target working state according to a preset clock signal and control signal. The target working state includes an open state and a closed state. When the clock control signal is at a high level, the processing module is in the open state, i.e., it begins to perform the correlation processing operation. When the clock control signal is at a low level, the processing module is in the closed state, i.e., it stops performing the correlation processing operation.

By introducing the clock generation module and the clock control module, the embodiment of the present application enables the processing module to switch between the open state and the closed state according to the control signal, ensuring that under different working states, it can be better adapted to different signal reception and processing needs, and improving the flexibility of the receiver. By controlling part of the processing modules to be in the closed state, the power consumption of the whole receiver system is reduced. When correlation processing is not required, the turning down of part of modules can effectively reduce energy consumption, extend the use time of the equipment, and improve the energy utilization efficiency. According to the action of the control signal, the working state of the processing module can be dynamically adjusted, thereby enabling the receiver to process and analyze the received signal more efficiently and improving the efficiency and performance of signal processing.

In an example, the sampled discrete received signals include N discrete received signals, and the plurality of processing modules include K processing module groups, each of the processing module groups being configured to perform correlation processing on the L sampled discrete received signals, N being a product of K and L, K being a length of the preamble symbol sequence, L being a spreading factor, and N, K and L being positive integers. Alternatively, the discrete received signal is a digital signal obtained after discrete sampling processing of the received signal. It is assumed that the discrete received signals are N discrete received signals.

The signal receiver contains K processing module groups. Each processing module group is responsible for performing correlation processing on data of a certain number of bits in the sampled discrete received signals. It is assumed that each processing module group processes L discrete received signals.

Each processing module group extracts useful information by performing correlation processing on a preamble symbol sequence. Specifically, the sampled N discrete received signals are subjected to a correlation operation with the preamble symbol sequence. According to the result of correlation operation, a correlation value or correlation coefficient is obtained. The correlation values or correlation coefficients indicate the degree of similarity or correlation between the received signals and the preamble symbol sequence, from which characteristics or parameters of the signals can be inferred. Due to the presence of a plurality of processing module groups in the signal receiver, correlation processing can be performed on different parts of the data at the same time, thereby realizing the effect of parallel processing. Each processing module group performs the correlation processing operation independently without affecting each other, which improves the processing efficiency of the signal receiver.

According to the control signal, part of processing module groups can be closed even if they are in a low power consumption state. This saves energy and resources and improves system efficiency.

The plurality of sampled discrete received signals of the embodiments of the present application are processed, which can more accurately correlate and analyze the received signals and improve the accuracy of signal processing. By means of the spreading factor and the preamble symbol sequence, the receiver can be made to have better suppression capability for interfering signals, which strengthens the system's anti-jamming capability and improves the reliability of the signal reception. Each processing module group can perform correlation processing on the L discrete received signals, so that when it is necessary to process signals of a larger bandwidth, it is possible to support the processing of signals of larger bandwidths by increasing the number of the processing module groups, which improves the system's scalability.

Figure 7:
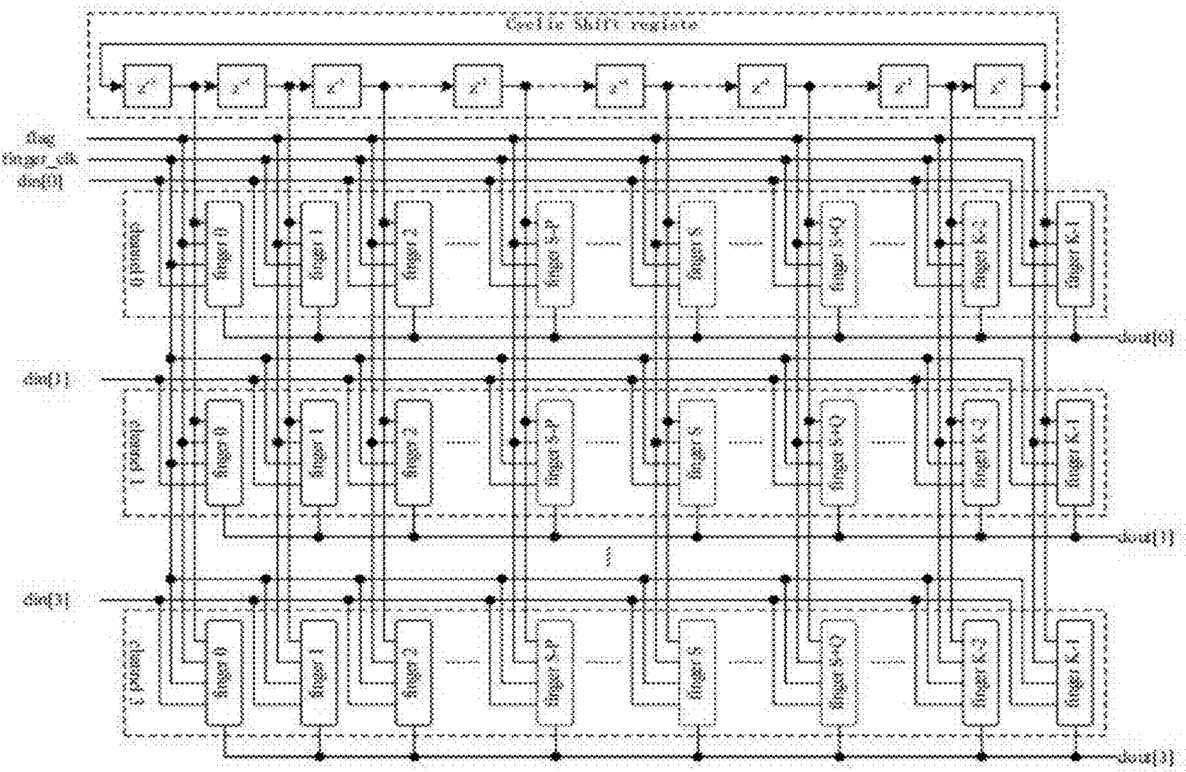
FIG. 7 is an architectural diagram of another UWB signal receiver disclosed by an embodiment of the present application.

Specifically, FIG. 7 is an architectural diagram of another UWB signal receiver provided by an embodiment of the present application. As can be seen from FIG. 7, an additional clock control module has been added, which can realize a more fine gating clock management for each finger unit.

Figure 8:
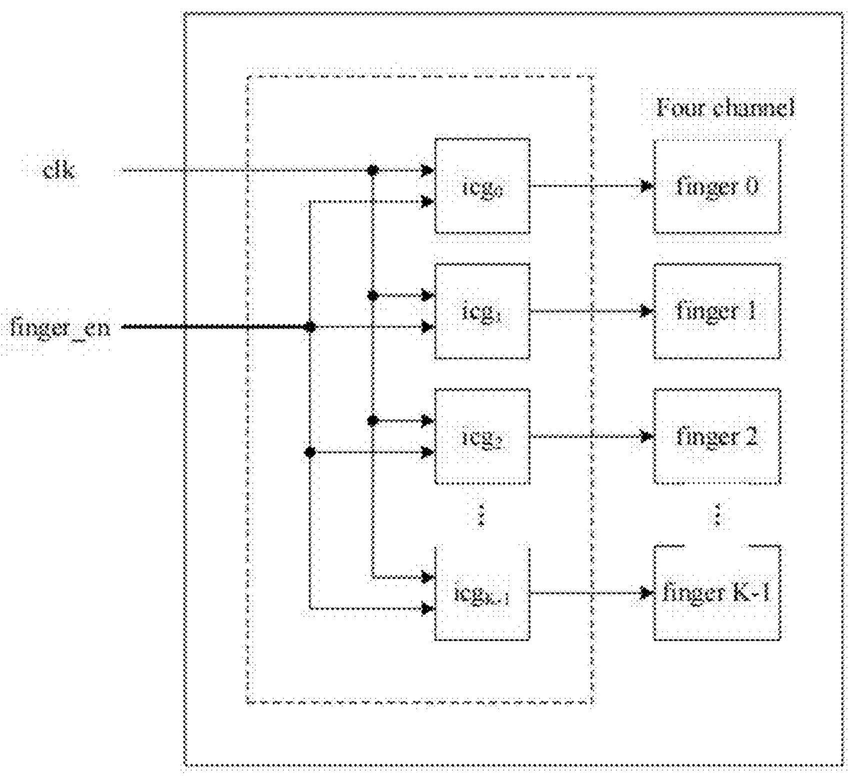
FIG. 8 is a schematic diagram of a structure of a clock control module in the UWB signal receiver disclosed by an embodiment of the present application.

FIG. 8 is a schematic diagram of a structure of a clock control module in the UWB signal receiver provided by an embodiment of the present application. As can be seen from FIG. 8, a K-bits control signal finger_en is defined, each bit corresponds to a finger unit with the same index value (e.g., bit 0 corresponds to finger 0), and bit (S'−P) to bit (S'+Q) of the finger_en are set to 1 ($S'=\lceil S/L \rceil$) in the channel estimation phase. The clock control module may utilize the control signal finger_en to generate K clock signals for controlling the same numbered finger units in L channels.

Figure 9:
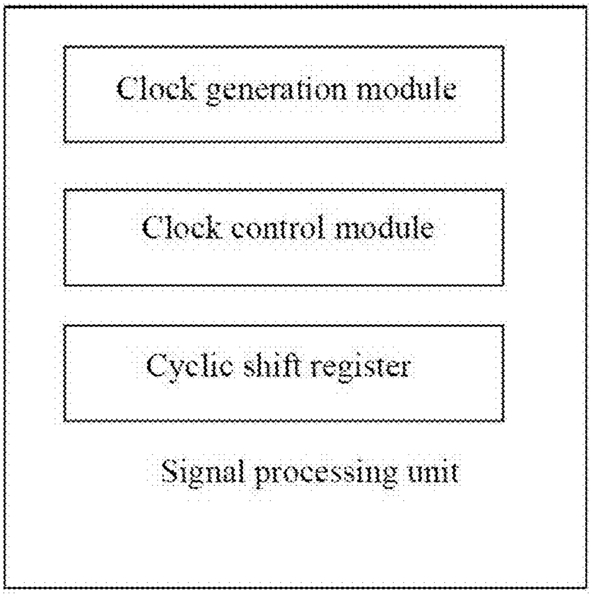
FIG. 9 is a schematic diagram of a structure of another UWB signal receiver disclosed by an embodiment of the present application.

FIG. 9 is a schematic diagram of a structure of another UWB signal receiver provided by an embodiment of the present application. As shown in FIG. 9, the signal processing unit further includes a cyclic shift register, the cyclic shift register including K flip-flops, and an output of each flip-flop, connected to one corresponding processing module group, being configured to output a shifted preamble symbol sequence to the corresponding processing module group; and Alternatively, the K flip-flops of the cyclic shift register are arranged in a sequence order of the preamble symbol sequence, and the output of each flip-flop is connected to one corresponding processing module group.

Further, each of the processing module groups is configured to perform correlation processing on the L discrete received signals according to the shifted preamble symbol sequence outputted by a corresponding flip-flop. Alternatively, in the processing module group, each processing module is configured to perform correlation processing on the L discrete received signals. In each processing module, the preamble symbol sequence is correlated with the L sampled discrete received signals to obtain a correlation processing result. The number of processing modules may be adjusted according to actual demands.

In an example, the clock control module includes K output ends; and each of the output ends is connected to one of a plurality of processing module groups, and each of the output ends is configured to output data of one of K bits of the control signal, the clock control module being configured to respectively act each of the K bits of the control signal on one of the processing module groups, allowing each processing module in the corresponding processing module group to be in the target working state. Alternatively, the clock control module includes K output ends, each of which is connected to one processing module group of the plurality of processing module groups, respectively, which can be realized by a digital signal processor (DSP) or a specially designed logic circuit.

Each output end is used to output data for one of the K bits of the control signal. Alternatively, the clock control module is capable of outputting multichannel control signals at the same time with sufficient parallel processing power.

The clock control module acts K bits of the control signal on a processing module group, ensuring that each processing module obtains a correct control signal through precise timing control.

In an example, the control signal includes K bits, and the channel estimation unit generating a control signal according to the index value includes that: an index number of a target processing module group corresponding to the strongest path is determined according to the index value and the number of processing modules included in each processing module group. Alternatively, the determination unit is configured to capture the first processing result to determine an index value corresponding to the strongest path of the received signal.

The index number of a target processing module group corresponding to the strongest path is calculated according to the index value and the number of processing modules included in each processing module group.

Further, the control signal is generated according to the index number of the target processing module group, with the bits in the control signal within a first preset distance range of the index number set to a high level and remaining bits set to a low level. Alternatively, a control signal is generated according to the index number of the target processing module group. The control signal has the same number of bits as the number of processing module groups.

In the control signal, bits within a first preset distance range of the index number are set to a high level to indicate that the corresponding processing module group is in an open state. The remaining bits are set to a low level to indicate that the other processing module groups are in a closed state.

The clock control module receives the control signal and acts the control signal on each processing module in the processing module group. When a certain bit of the control signal is in a high level, each processing module in the corresponding processing module group is in an open state and participates in the correlation processing operation.

When a certain bit of the control signal is in a low level, each processing module in the corresponding processing module group is in a closed state and does not participate in the correlation processing operation.

In an example, the first preset distance range includes S bits before the bit corresponding to the index number, and Q bits after the bit corresponding to the index number, S and Q being preset parameters and being positive integers. Alternatively, first, an index number of the target processing module group corresponding to the strongest path is determined according to the index value.

When the control signal is generated, S bits before the index number and Q bits after the index number are set to a high level, indicating that these bits are within the first preset distance range. This setting can be realized by a logic circuit or programming.

The bit corresponding to the index number is set to a high level, indicating the strongest path. Similarly, it can be realized by the logic circuit or programming.

The output of the control signal needs to be coordinated with the clock control module. Depending on a state (high level or low level) of each bit of the control signal, the clock control module will accordingly switch the processing modules in the processing module groups to the target working state.

In an example, the clock control module includes W output ends, each of the output ends being connected to R processing module groups in the plurality of processing module groups, and each of the output ends being configured to output data of one of W bits of the control signal, the clock control module being configured to respectively act each of the W bits of the control signal on R corresponding processing module groups, allowing each processing module in the R corresponding processing module groups to be in the target working state, $R=\lceil K/W \rceil$, $\lceil K/W \rceil$ indicating that a result of K/W is rounded up. Alternatively, the processing module group in the signal receiver includes a plurality of processing modules, each of which is configured to perform correlation processing on the sampled discrete received signal. At the same time, the processing module group further includes a cyclic shift register for outputting a shifted preamble symbol sequence to the processing module group. The cyclic shift register includes K flip-flops, and the K flip-flops are configured to perform shift operations in the cyclic shift register.

The clock control module includes W output ends, each of which is connected to R processing module groups of the plurality of processing module groups, respectively. The output end is configured to output data of one of the bits of the control signal. W and R are positive integers, R being a value obtained by rounding up a result of K/W.

An index number of a target processing module group corresponding to the strongest path is determined according to the index value and the number of processing modules included in each processing module group. A control signal is generated according to the index number of the target processing module group. In the control signal, the bits in the control signal within a first preset distance range of the index number are set to a high level and remaining bits are set to a low level. The index number, the preset distance range, and the number of bits is determined according to the specific design and requirements.

The clock control module acts on the corresponding processing modules group according to the bits of the control signal, allowing each processing module in the processing module groups to be in a target working state (open or closed state). Specifically, each processing module in the processing module groups is in the open state when the bits of the control signal are at a high level, and each processing module in the processing module groups is in the closed state when the bits of the control signal are at a low level.

In an example, the control signal includes W bits, and the channel estimation unit generating a control signal according to the index value includes that: an index number of a target processing module group corresponding to the strongest path is determined according to the index value and the number of processing modules included in each processing module group. Alternatively, the signal receiver includes a signal processing unit, a determination unit, and a channel estimation unit.

The signal processing unit includes a plurality of processing module groups, each of which is configured to perform correlation processing on data of a part of bits in the sampled discrete received signal. It is assumed that each of the processing module groups includes L processing modules.

The determination unit is configured to capture the first processing result to determine an index value corresponding to the strongest path of the received signal.

Further, the control signal is generated according to the index number of the target processing module group, with the bits in the control signal within a second preset distance range of the index number set to a high level and remaining bits set to a low level. Alternatively, the determination unit is configured to capture the first processing result to determine an index value corresponding to the strongest path of the received signal.

The channel estimation unit generates a control signal according to the index value, and the control signal includes W bits, where W is a positive integer.

The channel estimation unit determines an index number of a target processing module group corresponding to the strongest path according to the index value and the number of processing modules included in each processing module group.

When the control signal is generated, in the channel estimation unit, the bits within a second preset distance range of the index number are set to a high level and remaining bits are set to a low level.

The clock control module includes W output ends, each of which is connected to R processing module groups of the plurality of processing module groups, where R is a positive integer.

The clock control module acts the W bits of the control signal on R corresponding processing module groups respectively, allowing each processing module to be in a target working state. Specifically, the processing module is in an open state when the clock control signal is in a high level state, and the processing module is in a closed state when the clock control signal is in a low level state.

In an example, the second preset distance range includes $\lceil S/R \rceil$ bits before the bit corresponding to the index number, and $\lceil Q/R \rceil$ bits after the bit corresponding to the index number, S and Q being preset parameters and being positive integers. Alternatively, according to the received signal, correlation processing is performed to obtain a first processing result. According to the first processing result, an index number of the target processing module group corresponding to the strongest path of the received signal is determined, $\lceil S/R \rceil$ indicates that a result of S/R is rounded up, and $\lceil Q/R \rceil$ indicates that a result of Q/R is rounded up.

It is to be understood that all contents described in the present application in the form of $\lceil A/B \rceil$ have the specific meaning of rounding up the result of A/B, and all contents described in the present application in the form of $\lfloor A/B \rfloor$ have the specific meaning of rounding down the result of A/B. Taking $\lceil Q/R \rceil$ as an example, when Q is 10 and R is 3, $\lceil Q/R \rceil$ is a result of 10/3, and then rounded up, i.e., the result of $\lceil Q/R \rceil$ is 4. Taking $\lfloor S/L \rfloor$ as an example, when S is 10 and L is 3, $\lfloor S/L \rfloor$ is a result of 10/3, and then rounded down, i.e., the result of $\lfloor S/L \rfloor$ is 3. The foregoing examples are only exemplary examples to facilitate understanding of the present application solutions and are not to be construed as limitations on the solutions of the present application.

A control signal is generated according to the determined index number of the target processing module group. Specifically, the bits in the control signal within a second preset distance range of the index number are set to a high level and remaining bits are set to a low level.

The generated control signal is applied to an output end of the clock control module. Specifically, each bit of the control signal is applied to a corresponding processing module group separately, allowing each processing module in each processing module group to be in a target working state. This step may be realized by using a switching circuit.

Correlation processing is performed on the sampled discrete received signal by using the processing module in the open state to obtain a second processing result. Specifically, data of L bits in the sampled discrete received signal is input into the corresponding processing module group, and the correlation processing is performed by using a relevant algorithm.

The channel estimation is performed by using the channel estimation unit according to the second processing result, to obtain a channel estimation result. Specifically, the channel estimation may be performed using a relevant algorithm in a communication theory.

According to the channel estimation result and the index number of the target processing module group, a control signal is fed back to adjust the working state of the processing module group. Specifically, if the channel estimation results indicate that the results obtained in a current working state are less than satisfactory, the control signals may be regenerated and applied to the clock control module. The associated processing and channel estimation are repeated until satisfactory results are obtained.

It is to be understood that although individual steps in each of the above flow charts are shown sequentially as indicated by arrows, these steps are not necessarily executed sequentially in the order indicated by arrows. Unless expressly stated herein, the execution of these steps is not strictly limited in order, and these steps may be executed in other orders. Moreover, at least a portion of the steps in each of the above flow charts may include a plurality of sub-steps or a plurality of phases, which are not necessarily executed to completion at the same moment but may be executed at different moments. The execution sequence of these sub-steps or phases is not necessarily sequential, but can be executed in turn or alternately with other steps or at least a part of sub-steps or phases of other steps.

It is to be understood that references throughout the specification to "one embodiment" or "an embodiment" or "some embodiments" imply that a particular feature, structure or characteristic associated with an embodiment is included in at least one embodiment of the present application. Therefore, "in one embodiment" or "in an embodiment" or "in some embodiments" appearing at various places throughout the specification may not necessarily refer to the same embodiment. Furthermore, these particular features, structures or characteristics may be combined in one or more embodiments in any suitable manner. It is to be understood that in various embodiments of the present application, the serial number of the above processes does not mean the order of execution, and the order of execution of each process is to be determined by its function and internal logic, without constituting any limitation of the implementation processes of the embodiments of the present application. The above serial numbers of the embodiments of the present application are for descriptive purposes only and do not represent the advantages or disadvantages of the embodiments. The above description of various embodiments tends to emphasize the differences between various embodiments, and the identity or similarity can be referred to each other, and will not be repeated herein for the sake of brevity.

The term "and/or" herein is merely a description of an association relationship of associated objects, indicating that three types of relationships may exist, for example, an object A and/or an object B may be expressed as: the existence of the object A alone, the existence of both the object A and the object B, and the existence of the object B alone.

It is to be noted that in this specification, the terms "include/comprise", "contain", or any other variant thereof, are intended to cover non-exclusive inclusion, such that a process, method, article, or apparatus including a series of elements includes not only those elements, but also other elements that are not explicitly listed, or elements that are inherent to such a process, method, article, or device. Without further limitation, an element defined by a phrase "including a . . . " does not exclude the existence of other identical elements in the process, method, article or device including the element.

In the several embodiments provided in the present application, it is to be understood that the disclosed device and method may be realized in other ways. The embodiments described above are merely schematic. For example, the division of the modules is only a logical function division, and there can be additional division methods in actual implementation, e.g., multiple modules or components may be combined, or may be integrated into another system, or some features may be ignored or not implemented. Additionally, the mutual coupling, direct coupling or communication connection of the components shown or discussed can be indirect coupling or communication connection through some interfaces, devices or modules, and can be in electrical, mechanical or other forms.

The modules described above as separate components may or may not be physically separated, and the components displayed as modules may or may not be physical modules, which can be located in one place or distributed to multiple network units; and some or all of these modules may be selected according to the actual demands to realize the purpose of the embodiment solution.

Additionally, various functional modules in the embodiments of the present application may all be integrated in a single processing unit, or each module is taken as a unit separately, or two or more modules may be integrated in a single unit. The above integrated modules may be realized either in a form of hardware, or in a form of hardware plus software functional units.

Those skilled in the art can understand that: all or part of the steps for realizing the above method embodiment may be accomplished by hardware related to program instructions, and the aforementioned program may be stored in a computer-readable storage medium; and when the program is executed, the steps including the above method embodiment are executed. The aforementioned storage medium includes: a portable storage device, a read only memory (ROM), a diskette, or an optical disk, and various media that can store a program code.

Alternatively, the unit integrated as described above in the present application may be stored in a computer-readable storage medium if it is implemented in the form of a software function module and sold or used as a stand-alone product. Based on this understanding, the technical solution of the embodiments of the present application may essentially or in part contribute to the relevant technology in the form of a software product. A computer software product is stored in a storage medium, and includes a plurality of instructions for causing an electronic device to perform all or part of the methods described in various embodiments of the present application. The aforementioned storage media include: a portable storage device, an ROM, a diskette, or an optical disk, and various other media that can store a program code.

The methods disclosed in several method embodiments provided in the present application can be arbitrarily combined without conflict to obtain new method embodiments.

The features disclosed in several product embodiments provided in the present application can be arbitrarily combined without conflict to obtain new product embodiments.

The features disclosed in several method or device embodiments provided in the present application can be arbitrarily combined without conflict to obtain new method embodiments or device embodiments.

The foregoing is only an implementation of the present application, but the scope of protection of the present application is not limited thereto. Any person familiar with the technical field can easily think of changes or substitutions within the technical scope disclosed in the present application, which are to be covered by the scope of protection of the present application. Therefore, the scope of protection of the present application is to be subject to the scope of protection of the stated claims.

The invention claimed is:

1. An ultra-wide band (UWB) signal receiver, comprising a signal processing unit, a determination unit and a channel estimation unit, the signal processing unit being connected to the determination unit and the channel estimation unit, and the determination unit being also connected to the channel estimation unit, wherein:

the signal processing unit comprises a plurality of processing modules, and the signal processing unit is configured to perform correlation processing on a plurality of sampled discrete received signals through a preamble symbol sequence and the plurality of processing modules to obtain a first processing result, the plurality of sampled discrete received signals being a plurality of signals after sampling the received signals;

the determination unit is configured to capture the first processing result and determine an index value corresponding to the strongest path of the received signal;

the channel estimation unit is configured to generate a control signal according to the index value, and the control signal is configured to control part of the processing modules in the signal processing unit to be in a closed state;

the signal processing unit is further configured to control the part of the processing modules to be in the closed state according to the control signal, and perform correlation processing on the plurality of sampled discrete received signals by using remaining processing modules in an open state and the preamble symbol sequence to obtain a second processing result; and the channel estimation unit is further configured to perform channel estimation according to the second processing result to obtain a channel estimation result.

2. The signal receiver according to claim 1, wherein the signal processing unit further comprises a clock generation module and a clock control module, the clock generation module being configured to generate a preset clock signal;

the clock control module being configured to receive the control signal; and each of the processing modules being configured to be in a target working state under the action of the preset clock signal and the control signal, the target working state comprising the open state or the closed state, wherein, when a clock control signal is in a high level state, the target working state is in the open state; and when a clock control signal is in a low level state, the target working state is in the closed state.

3. The signal receiver according to claim 2, wherein the plurality of sampled discrete received signals comprise N discrete received signals, and the plurality of processing modules comprise K processing module groups, each of the processing module groups being configured to perform correlation processing on the L sampled discrete received signals, N being a product of K and L, K being a length of the preamble symbol sequence, L being a spreading factor, and N, K and L being positive integers.

4. The signal receiver according to claim 3, wherein the signal processing unit further comprises a cyclic shift register, the cyclic shift register comprising K flip-flops, and an output of each flip-flop, connected to one corresponding processing module group, being configured to output a shifted preamble symbol sequence to the corresponding processing module group; and each of the processing module groups is configured to perform correlation processing on the L discrete received signals according to the shifted preamble symbol sequence outputted by a corresponding flip-flop.

5. The signal receiver according to claim 4, wherein the clock control module comprises K output ends; and each of the output ends is connected to one of a plurality of processing module groups, and each of the output ends is configured to output data of one of K bits of the control signal, the clock control module being configured to respectively act each of the K bits of the control signal on one of the processing module groups, allowing each processing module in the corresponding processing module group to be in the target working state.

6. The signal receiver according to claim 5, wherein the control signal comprises K bits, and generating, by the channel estimation unit, a control signal according to the index value comprises:

determining an index number of a target processing module group corresponding to the strongest path according to the index value and the number of processing modules comprised in each processing module group; and generating the control signal according to the index number of the target processing module group, with the bits in the control signal within a first preset distance range of the index number set to a high level and remaining bits set to a low level.

7. The signal receiver according to claim 6, wherein the first preset distance range comprises S bits before the bit corresponding to the index number, and Q bits after the bit corresponding to the index number, S and Q being preset parameters and being positive integers.

8. The signal receiver according to claim 4, wherein the clock control module comprises W output ends, each of the output ends being connected to R processing module groups in the plurality of processing module groups, and each of the output ends being configured to output data of one of W bits of the control signal, the clock control module being configured to respectively act each of the W bits of the control signal on R corresponding processing module groups, allowing each processing module in the R corresponding processing module groups to be in the target working state, $R=\lceil K/W \rceil$, $\lceil K/W \rceil$ indicating that a result of K/W is rounded up.

9. The signal receiver according to claim 8, wherein the control signal comprises W bits, and generating, by the channel estimation unit, a control signal according to the index value comprises:

determining an index number of a target processing module group corresponding to the strongest path according to the index value and the number of processing modules comprised in each processing module group; and generating the control signal according to the index number of the target processing module group, with the bits in the control signal within a second preset distance range of the index number set to a high level and remaining bits set to a low level.

10. The signal receiver according to claim 9, wherein the second preset distance range comprises $\lceil S/R \rceil$ bits before the bit corresponding to the index number, and $\lceil Q/R \rceil$ bits after the bit corresponding to the index number, S and Q being preset parameters and being positive integers, $\lceil S/R \rceil$ indicating that a result of S/R is rounded up, and $\lceil Q/R \rceil$ indicating that a result of Q/R is rounded up.

* * * * *